(12) United States Patent
Liu et al.

(10) Patent No.: US 8,223,601 B2
(45) Date of Patent: *Jul. 17, 2012

(54) DEVICE FOR ACCESSING ADDRESS INFORMATION IN AN OPTICAL DISC

(75) Inventors: Pi-Hai Liu, Taipei (TW); Chun-Nan Chen, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,840

(22) Filed: Sep. 23, 2011

(65) Prior Publication Data

US 2012/0014232 A1    Jan. 19, 2012

Related U.S. Application Data

(63) Continuation of application No. 11/106,609, filed on Apr. 15, 2005, now Pat. No. 8,050,151.

(30) Foreign Application Priority Data

Dec. 21, 2004   (TW) .............................. 93139915 A

(51) Int. Cl.
*G11B 7/007* (2006.01)
(52) U.S. Cl. .................................. 369/44.13; 369/53.14
(58) Field of Classification Search ............... 369/44.13, 369/53.34, 30.01, 30.1, 30.3, 47.28, 47.31, 369/47.34, 47.47, 47.54, 53.4, 105, 124.05, 369/124.08, 277

See application file for complete search history.

(56) References Cited

U.S. PATENT DOCUMENTS

| | | | |
|---|---|---|---|
| 5,661,713 | A | 8/1997 | Honma |
| 7,099,244 | B2 | 8/2006 | Nakata et al. |
| 8,050,151 | B2 * | 11/2011 | Liu et al. ................... 369/44.13 |
| 2003/0021217 | A1 | 1/2003 | Kim et al. |
| 2003/0214900 | A1 | 11/2003 | Shim et al. |
| 2004/0252602 | A1 | 12/2004 | Muzio et al. |
| 2005/0018576 | A1 | 1/2005 | Kao et al. |

OTHER PUBLICATIONS

Wobble-Address Format of the Blu-ray Disc, Shoei Kobayashi et al. Jpn. J. Appl. Phys. vol. 42 (2003) pp. 915-918; Part 1, No. 2B, Feb. 2003; The Japan Society of Applied Physics.

* cited by examiner

*Primary Examiner* — Hoa T Nguyen
*Assistant Examiner* — Andrew Sasinowski
(74) *Attorney, Agent, or Firm* — Birch, Stewart, Kolasch & Birch, LLP

(57) ABSTRACT

An address-accessing device includes first and second information generators for producing first and second information according to the received address signals; a phase offset detector for producing a phase offset according to the first and second information; a reference signal generator for producing a reference signal according to the phase offset, the first information and the second information; and a decoder used to determine the structure type of an address-in-pregroove unit (ADIP) according to the reference value. This address-accessing device is capable of adjusting the decision level and the phase offset automatically to lower the error rate occurring in the address access procedure.

12 Claims, 13 Drawing Sheets

DEVICE FOR ACCESSING ADDRESS INFORMATION IN AN OPTICAL DISC

This application is a Continuation of application Ser. No. 11/106,609 filed on Apr. 15, 2005, now U.S. Pat. No. 8,050,151, which claims priority to application Ser. No. 93139915 filed in Taiwan, on Dec. 21, 2004. The entire contents of all of the above applications are hereby incorporated by reference.

BACKGROUND OF THE INVENTION

1. Field of the Invention

The present invention is related to a device for accessing address information in an optical disc and, more particularly, to an address-accessing device that is capable of adjusting the decision level and phase offset when receiving the address signals.

2. Description of Related Art

Optical discs, such as digital versatile discs (DVDs) and video compact discs (VCDs), are already used extensively in business and personal activities. They are usually used to record mass data or video files, such as movies, music files or application software. Recently, in order to enlarge the storage capacity of optical discs, a novel standard related to Blu-ray discs, which have five times the storage capacity of DVDs, was developed to fulfill the consumers' needs in the future.

Reference is made to FIG. 1a, which is a schematic diagram of a conventional optical disc. Generally, in the manufacture of an optical disc, a spiral pre-groove 1 should be formed to define the physical addresses of the optical disc. Reference is made to FIG. 1b, which is an enlarged diagram of a segment of the pre-groove. The pre-groove segment 2 is formed in a specific wobbling manner, such as a specific phase or frequency, to define the physical addresses of the optical disc.

In general, after the fabrication of a Blu-ray disc is finished, the pro-groove of the Blu-ray disc must have multiple address words, called address-in-pregroove words (ADIP words) for definition of the physical addresses. Conventionally, every ADIP word of the Blu-ray disc has 83 address units, called address-in-pregroove units (ADIP units). Each of the ADIP units has 56 nominal-wobble-length units (NWL units).

Therein, every ADIP unit has minimum-shift-keying marks (MSK marks). The relative positions of the MSK marks are used to identify the attributes of the ADIP units. Furthermore, the physical addresses are found via identification of the digits ("1" or "0") recorded in the ADIP words. Thus, the physical address of every location of the Blu-ray disc can be found by identifying and decoding the digits recorded in the ADIP words. Thereby, a Blu-ray optical drive can performs a Read or Write operation according to the information of these physical addresses.

In accordance with the specification of Blu-ray discs, the first eight ADIP units of an ADIP word are formed by combining sync units and monotone units, and the last 75 ADIP units are formed by combining data units and reference units. In addition, each one of the last 37 NWL units (i.e. NWL 18-55) in an ADIP unit, which has 56 NWL units in total, is formed in one of three predetermined structures.

Reference is made to FIGS. 2a and 2b, which show the predetermined structures. These predetermined structures are cos(wt), cos(wt)+sin(2 wt)/4 and cost(wt)−sin(2 wt)/4. Therein, "t" represents time and w=2pi*fw, where "fw" represents a predetermined frequency value for NWL units. The cos(wt)+sin(2 wt)/4 structure represents "1" and the cos(wt)−sin(2 wt)/4 structure represents "0".

Reference is made to FIG. 3. In an ADIP word, the first eight ADIP units are formed by combining sync units and monotone units, and their NWL 18-55 are formed as the cos(wt) structure. The last 75 ADIP units of the ADIP word are divided into 15 groups. Each of the groups consists of one reference unit and four data units. Depending on the value of the digits (i.e. "1" or "0"), the data units are designated as data_1 or data_0. Each one of the NWL 18-55 for data_1 is formed as the cos(wt)+sin(2 wt)/4 structure and the same for data_0 is formed as the cos(wt)−sin(2 wt)/4 structure. Furthermore, each one of the NWL 18-55 in the reference unit is formed as the cos(wt)−sin(2 wt)/4 structure. This means that the NWL 18-55 of the reference unit has the same structure as that of the data_0 unit.

Reference is made to FIG. 4, which is a block diagram of a conventional address-accessing device. The device has a matching unit 403, a sum & sampling unit 405 and a decoder 407. The matching unit 403 is used for calculating a matched value of a matching signal (i.e. sin(2 wt)). The matching unit 403 is implemented by using a matched filter. The sum & sampling unit 405 is used to sum up the matched values of the NWL 18-55 of an ADIP unit to produce a reference value. The decoder 407 is used to determine the structure type of the NWL 18-55 of the ADIP unit according to the reference value. However, due to an unknown phase offset or a gain variation, the decoder 407 may have an unpredictable reference offset and make the error rate of the address access increase.

Aiming to solve the problem caused by the phase offset, another address-accessing device was proposed. Reference is made to FIG. 5, which is a block diagram for this kind of address-accessing device. This device has a matching unit 503, a sum & sampling unit 505, a decoder 507 and a phase-offset detector 509.

The matching unit 503 is used for calculating a matched value according to a matching signal (i.e. sin(2 wt+q)), in which "q" represents the phase offset. The phase-offset detector 509 is used to estimate the value of q according to the matched value and adjust the phase reference value of the matching unit 503. The sum & sampling unit 505 is used to sum up the matched values of the NWL 18-55 of an ADIP unit to produce a reference value. The decoder 507 is used to determine the structure type of the NWL 18-55 of the ADIP unit according to the reference value. However, this device needs a matching circuit whose phase reference value is adjustable. It makes the difficulty and complexity of the circuit design increase greatly.

Accordingly, as discussed above, the prior art still has some drawbacks that could be improved upon. The present invention aims to resolve the drawbacks of the prior art.

SUMMARY OF THE INVENTION

The present invention provides an address-accessing device having a matching unit for calculating the matched values corresponding to the received address signal according to the matching signal; a sum & sampling unit for summing up the matched values obtained within a predetermined time period to produce a reference signal; a decision level adjustment unit capable of using the matched values provided by the matching unit to calculate a decision level; and a decoder used to determine a structure type of an address-in-pregroove (ADIP) unit according to the reference value and the decision level.

The present invention provides another address-accessing device having a first information generator for producing a first information according to received address signals; a second information generator for producing a second information according to the received address signals; a phase offset detector for producing a phase offset according to the first information and the second information; a reference signal generator for producing a reference signal according to the phase offset, the first information and the second information; and a decoder used to determine a structure type of an ADIP unit according to the reference value.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 6:
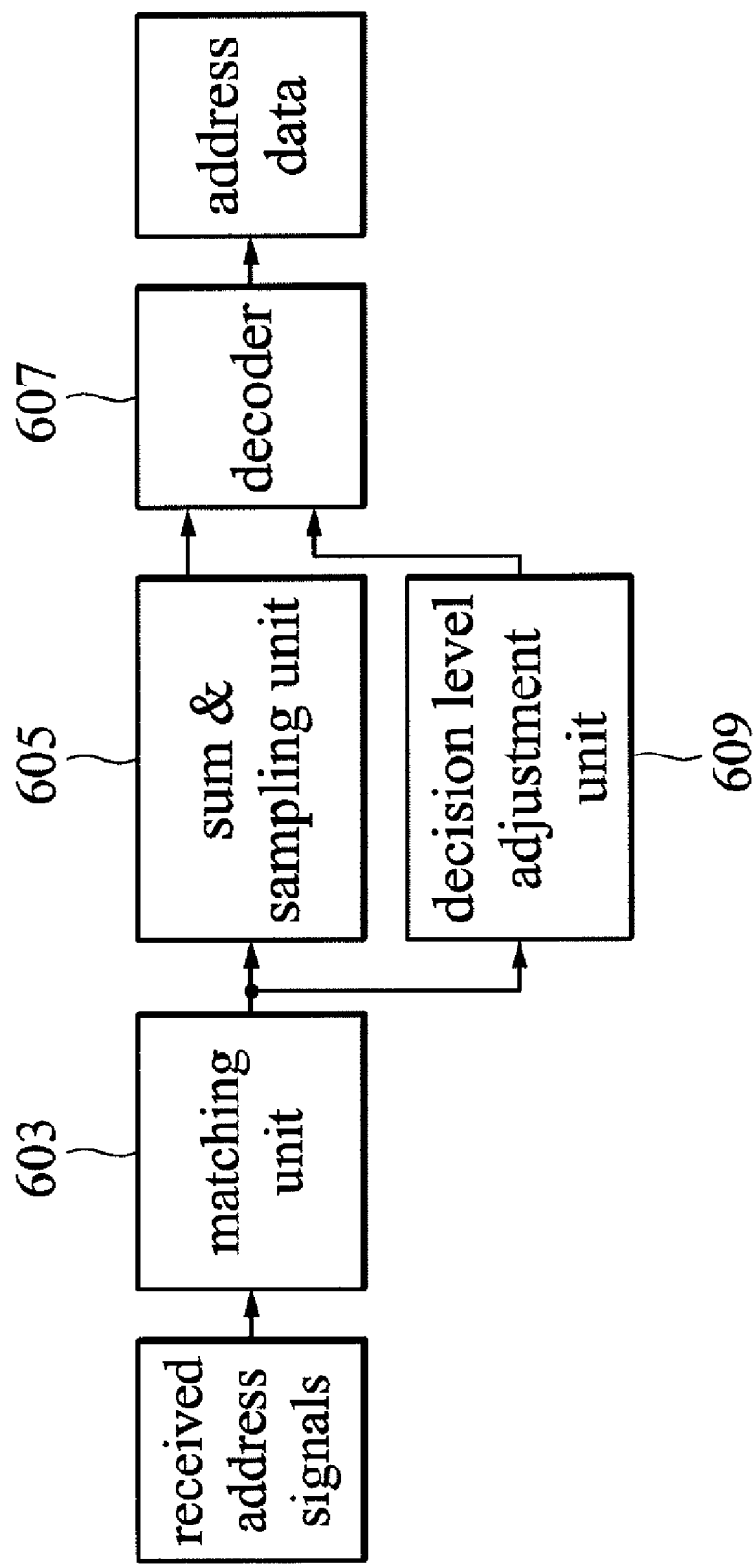
FIG. 6 is a block diagram of an address-accessing device in accordance with the first embodiment of the present invention.

Reference is made to FIG. 6, which is a block diagram of an address-accessing device in accordance with the first embodiment of the present invention. This embodiment includes a matching unit 603, a sum & sampling unit 605, a decoder 607 and a decision level adjustment unit 609. The matching unit 603 is used for calculating a matched value according to a matching signal (i.e. sin(2 wt)). The matching unit 603 is realized by using a matched filter. The sum & sampling unit 605 is used to sum up the matched values of the NWL 18-55 of an ADIP unit to produce a reference value. The decoder 607 is used to determine the structure type of the NWL 18-55 of the ADIP unit according to the reference value.

The difference between this embodiment and the prior art is that this embodiment has a decision level adjustment unit 609, which is used to adjust the decision level of the decoder 607 and thereby reduce the error rate of address access. This embodiment of the present invention first accesses the segments of an ADIP word without the constituent of sin(2 wt) and then calculate the average of the matched values of the received signals to produce a decision level.

For example, the present invention first accesses the sync units or monotone units of ADIP words, i.e. the segments without the constituent of sin(2 wt), and then calculates the average of the matched values of the received signals to produce the decision level. Moreover, the NWL 0-17 of every APID unit in APID words, which have no constituent of sin(2 wt), are also able to be used to produce the decision level in the same way.

Furthermore, in another embodiment, the present invention first accesses the segments of data_1 and data_0, which have the constituents of sin(2 wt) and −sin(2 wt) respectively, and then calculates the averages of the matched values of the data_1 and data_0 signals to produces L1 and L0 respectively. Lastly, (L1+L0)/2 is used as the decision level.

In practice, the implement of the present invention is not limited to the methods mentioned above. The present invention can also be implemented via a combination of these methods.

Figure 7:
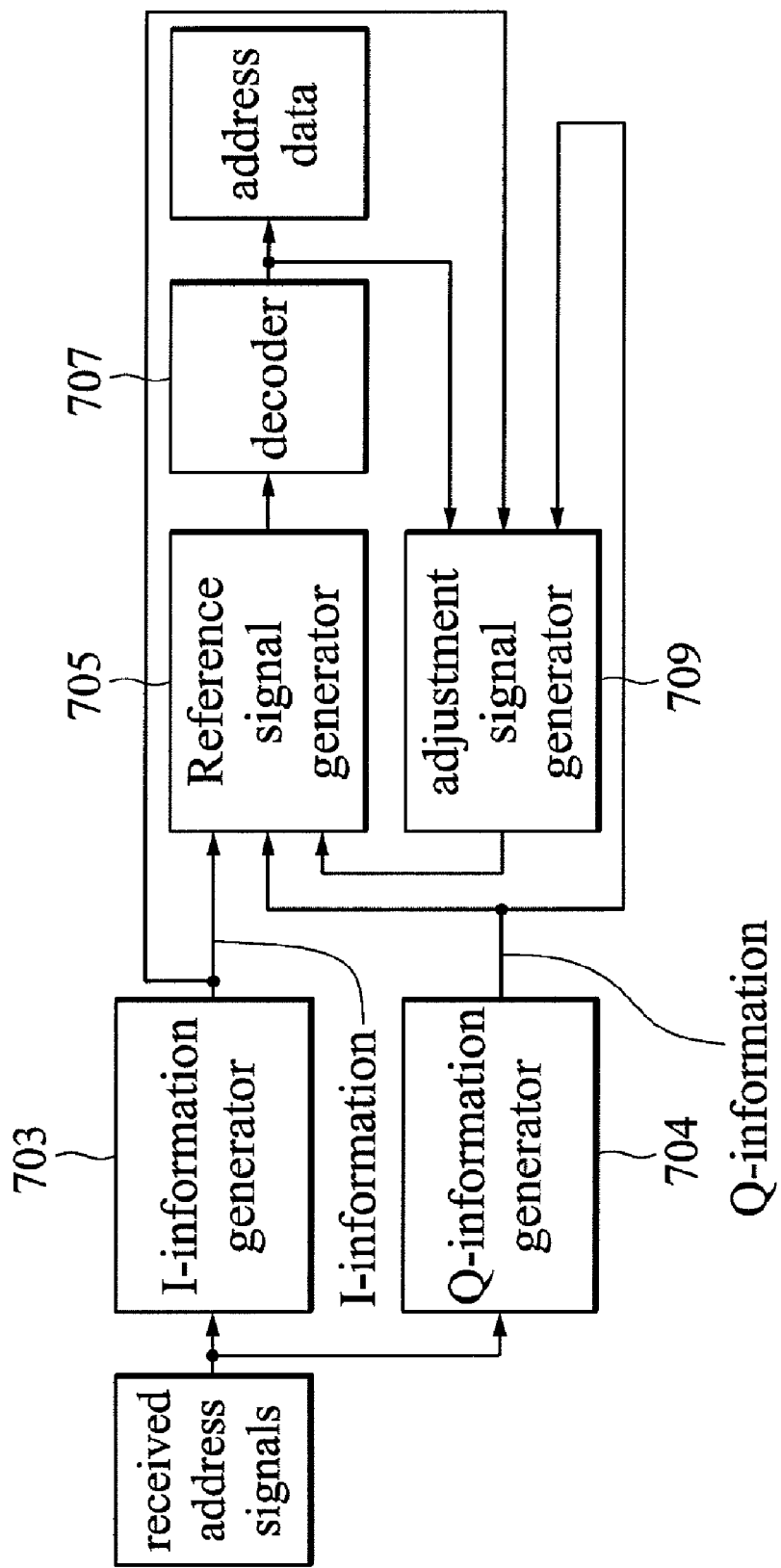
FIG. 7 is a block diagram of an address-accessing device in accordance with the second embodiment of the present invention.

Reference is made to FIG. 7, which is a block diagram of an address-accessing device in accordance with the second embodiment of the present invention. This embodiment includes an I-information generator 703, a Q-information generator 704, a reference signal generator 705, a decoder 707 and an adjustment signal generator 709.

The I-information generator 703 is used for calculating an I-matched value according to a first matching signal (i.e. sin(2 wt)) and summing up the I-matched values of the NWL 18-55 of an ADIP unit to produce the I-information. The Q-information generator 704 is used for calculating a Q-matched value according to a second matching signal (i.e. cos(2 wt)) and summing up the Q-matched values of the NWL 18-55 of an ADIP unit to produce the Q-information.

The adjustment signal generator 709 is used to produce an adjustment parameter, such as the phase offset q, according to the I-information, Q-information and the output of the decoder 707. If the adjustment signal generator 709 is used to produce the phase offset q directly, it can also be referred to as a phase offset detector. The reference signal generator 705 is used to produce a reference value according to the I-information, Q-information and the adjustment parameter. The decoder 707 is used to determine the structure type of the NWL 18-55 of the ADIP unit according to the reference value.

Figure 8:
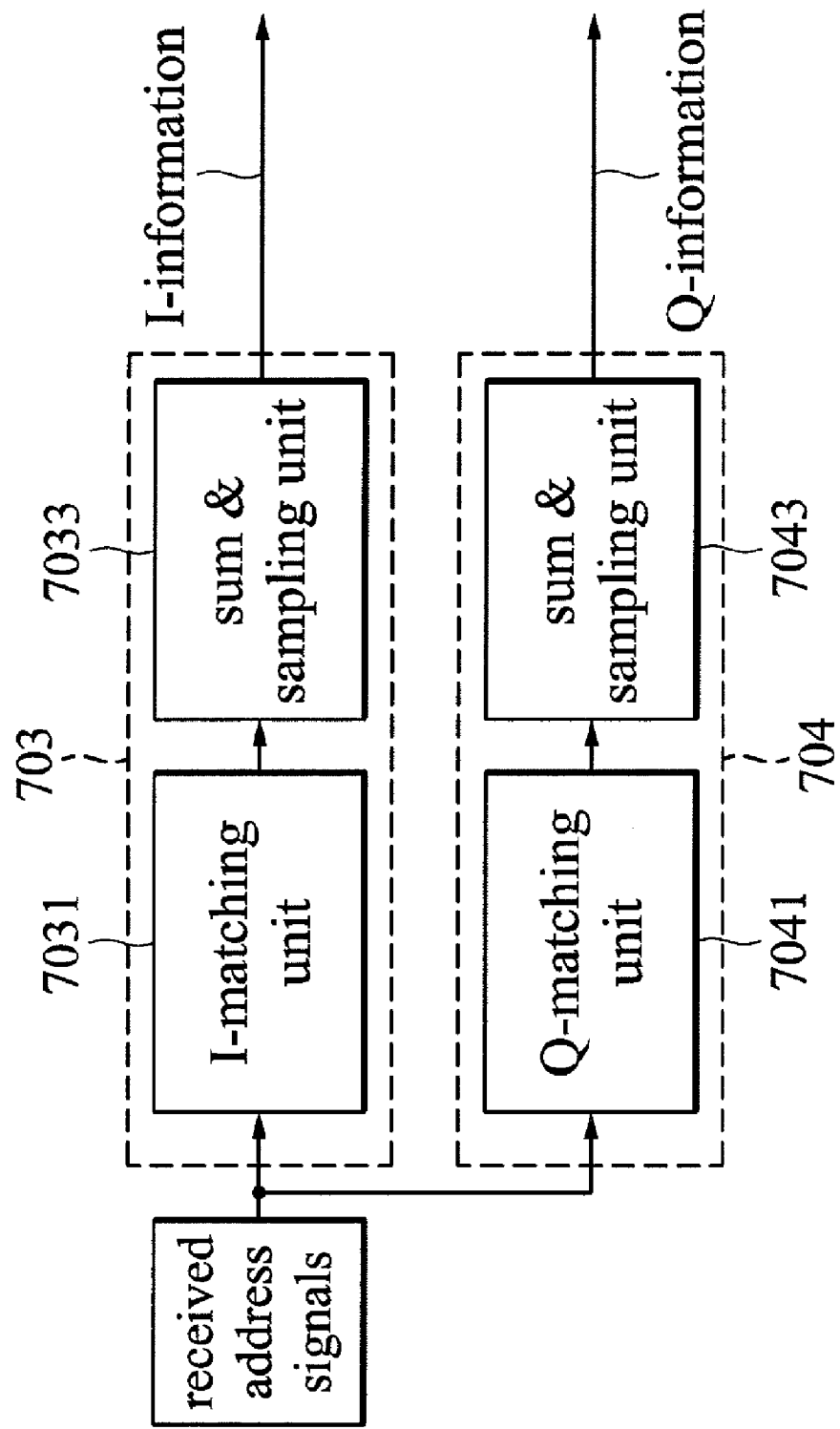
FIG. 8 is a block diagram of the I- and Q-information generators in accordance with the present invention.

Reference is made to FIG. 8, which is a block diagram of the I- and Q-information generators in accordance with the present invention. As shown in the figure, the I-information generator 703 further includes an I-matching unit 7031 and a sum & sampling unit 7033, and the Q-information generator 704 further includes a Q-matching unit 7041 and a sum & sampling unit 7043.

The I-matching unit 7031 is used for calculating the I-matched value according to the first matching signal (i.e. sin(2 wt)). The sum & sampling unit 7033 is used for summing up the I-matched values of the NWL 18-55 of an ADIP unit to produce the I-information. The Q-matching unit 7041 is used for calculating the Q-matched value according to the second matching signal (i.e. cos(2 wt)). The sum & sampling unit 7043 is used for summing up the Q-matched values of the NWL 18-55 of an ADIP unit to produce the Q-information.

Regarding the determination of the phase offset (i.e. adjustment parameter), the present invention sums up (or averages) the I- and Q-information corresponding to a segment of address data determined as data_0 to produce summation values (or average values) I0 and Q0, respectively. The present invention also sums up (or averages) the I- and Q-information corresponding to a segment of address data determined as data_1 to produce the summation values (or average values) I1 and Q1, respectively. The present invention uses the values of Q1, I1, Q0 and I0 to calculate the phase offset. In this embodiment, the phase offset is $q=\tan^{-1}((Q1-Q0)/(I1-I0))$.

Furthermore, the present invention can also be realized only by using the I- and Q-information corresponding to a segment of address data determined as data_0 to determine the phase offset. The present invention first sums up (or averages) the I- and Q-information corresponding to a segment of address data determined as data_0 to produce summation values (or average values) I0 and Q0, respectively. Next, the present invention obtains the phase offset via $q=\tan^{-1}(Q0/I0)$. Moreover, since reference units have the same structure type as the data_0 units (it means both of them have the cos(wt)−sin(2 wt)/4 structure), the present invention can also use the I- and Q-information corresponding to a segment of address data determined as reference units to produce the values of I0 and Q0.

Without loss of generality, the present invention is further clarified as follows. If the original address signal is sin(2 wt), the phase offset is "q" and the received address signal is A*sin(2 wt+q), where "A" represents the amplitude of the received signal, then the received address signal can be written as below:

$$A*\sin(2wt+q) = A*\cos(q)*\sin(2wt) + A*\sin(q)*\cos(2wt).$$

Thus, the I-information and the Q-information can be expressed as:

$$I\text{-information} = \int_0^{n\pi/w} [A*\cos(q)*\sin(2wt) + A*\sin(q)*\cos(2wt)] * \sin(2wt)\,dt$$

$$= \int_0^{n\pi/w} A*\cos(q)*\sin(2wt)*\sin(2wt)\,dt +$$

$$\int_0^{n\pi/w} A*\sin(q)*\sin(4wt)/2\,dt$$

$$= \cos(q)*\int_0^{n\pi/w} A*\sin(2wt)*\sin(2wt)\,dt$$

$$= \cos(q)*K$$

$$Q\text{-information} = \int_0^{n\pi/w} [A*\cos(q)*\sin(2wt) + A*\sin(q)*\cos(2wt)] * \cos(2wt)\,dt$$

$$= \int_0^{n\pi/w} A*\cos(q)*\sin(4wt)/2\,dt +$$

$$\int_0^{n\pi/w} A*\sin(q)*\cos(2wt)*\cos(2wt)\,dt$$

$$= \sin(q)*\int_0^{n\pi/w} A*\cos(2wt)*\cos(2wt)\,dt$$

$$= \sin(q)*K$$

where $$K = \int_0^{n\pi/w} A*\sin(2wt)*\sin(2wt)\,dt$$

$$= \int_0^{n\pi/w} A*\cos(2wt)*\cos(2wt)\,dt$$

and "n" is an integer number.

In order to obtain the reference value "K", the reference signal generator 705 of the present invention substitutes the value of the phase offset q (i.e. the adjustment parameter) provided by the adjustment signal generator 709 into the following equation:

$$I\text{-information} * \cos(q) + Q\text{-information} * \sin(q) =$$
$$\cos(q)*\cos(q)*K + \sin(q)*K = K$$

Thus, the reference value outputted from the reference signal generator 705 can be expressed as "I-information*cos(q)+Q-information*sin(q)". The reference value can also be expressed as "a*I-information+b*Q-information", where a=cos(q) and b=sin(q).

Furthermore, it isn't necessary for the adjustment parameter outputted from the adjustment signal generator 709 to be the phase offset q. It can also be a value related to the phase offset q. For example, the adjustment signal generator 709 of the present invention can pass the values of "a" and "b", i.e. cos(q) and sin(q), directly to the reference signal generator 705. Thus, the reference value outputted from the reference signal generator 705 can be expressed as "a*I-information+b*Q-information". This means that the reference signal generator 705 can directly multiply the values of "a" and "b" with the I- and Q-information respectively to obtain the reference value.

In order to lower the complexity of the present invention, "+1" or "−1" can be used to replace the values of "a" and "b", depending on the results of (I1−I0) and (Q1−Q0) or depending on the summation values of the I- and Q-information. In general, if the phase offset is small, the present invention can let a=+1 and use "I-information+Q-information*sin(q)" as the reference value. Moreover, the present invention can be further simplified to make a=+1 and use "I-information+Q-information*b" as the reference value.

Furthermore, in the foresaid embodiment, the I-matching unit 7031 and the Q-matching unit 7041 can also use "+1" and "−1" to represent the matched values of NWL units. After the matched values are obtained, the present invention uses the sum & sampling units 7033 and 7043 to sum up these matched values. Thereby, the present invention mitigates the effect of abrupt noises, and the complexity of the present invention is reduced. Moreover, for further simplifying the complexity, the first matching signal (sin 2 wt) and/or second matching signal (cos 2 wt) can also be represented by "+1" and "−1", depending on the current values of the matching signals.

Figure 9:
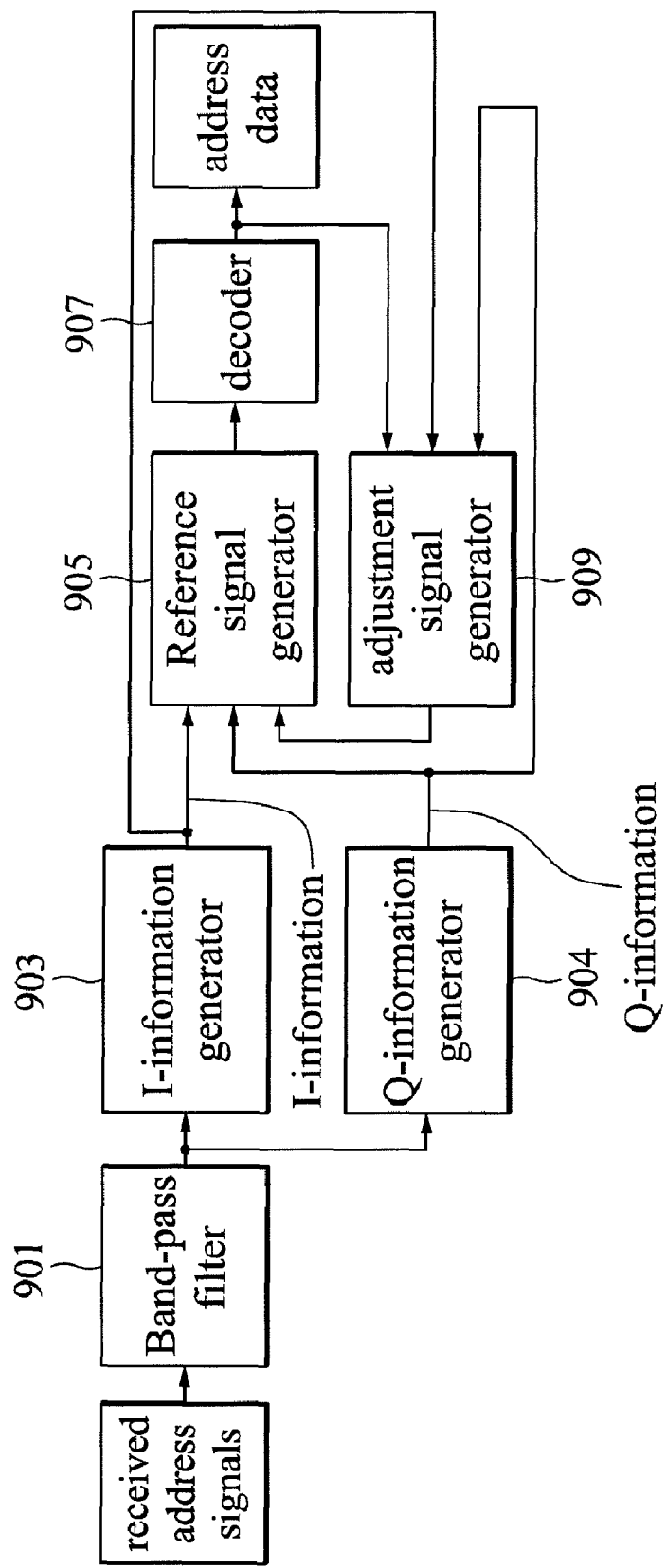
FIG. 9 is a block diagram of an address-accessing device in accordance with the third embodiment of the present invention.

Reference is made to FIG. 9, which is a block diagram of an address-accessing device in accordance with the third embodiment of the present invention. This embodiment includes a band-pass filter 901, an I-information generator 903, a Q-information generator 904, a reference signal generator 905, a decoder 907 and an adjustment signal generator 909. The band-pass filter 901 is used to filter the constituent of sin(2 wt) out from the received signals to produce a filtered signal. The I-information generator 903 is used to sample the filtered signal at I-sampling timing to produce I-sampling signals and sum up the I-sampling signals of the NWL 18-55 of an ADIP unit to produce the I-information. The Q-information generator 904 is used to sample the filtered signal at Q-sampling timing to produce Q-sampling signals and sum up the Q-sampling signals of the NWL 18-55 of an ADIP unit to produce the Q-information.

The adjustment signal generator 909 is used to produce an adjustment parameter according to the I-information, Q-information and the output of the decoder 907. The reference signal generator 905 is used to produce a reference value according to the I-information, Q-information and the adjustment parameter. The decoder 907 is used to determine the structure type of the NWL 18-55 of the ADIP unit according to the reference value.

Figure 10:
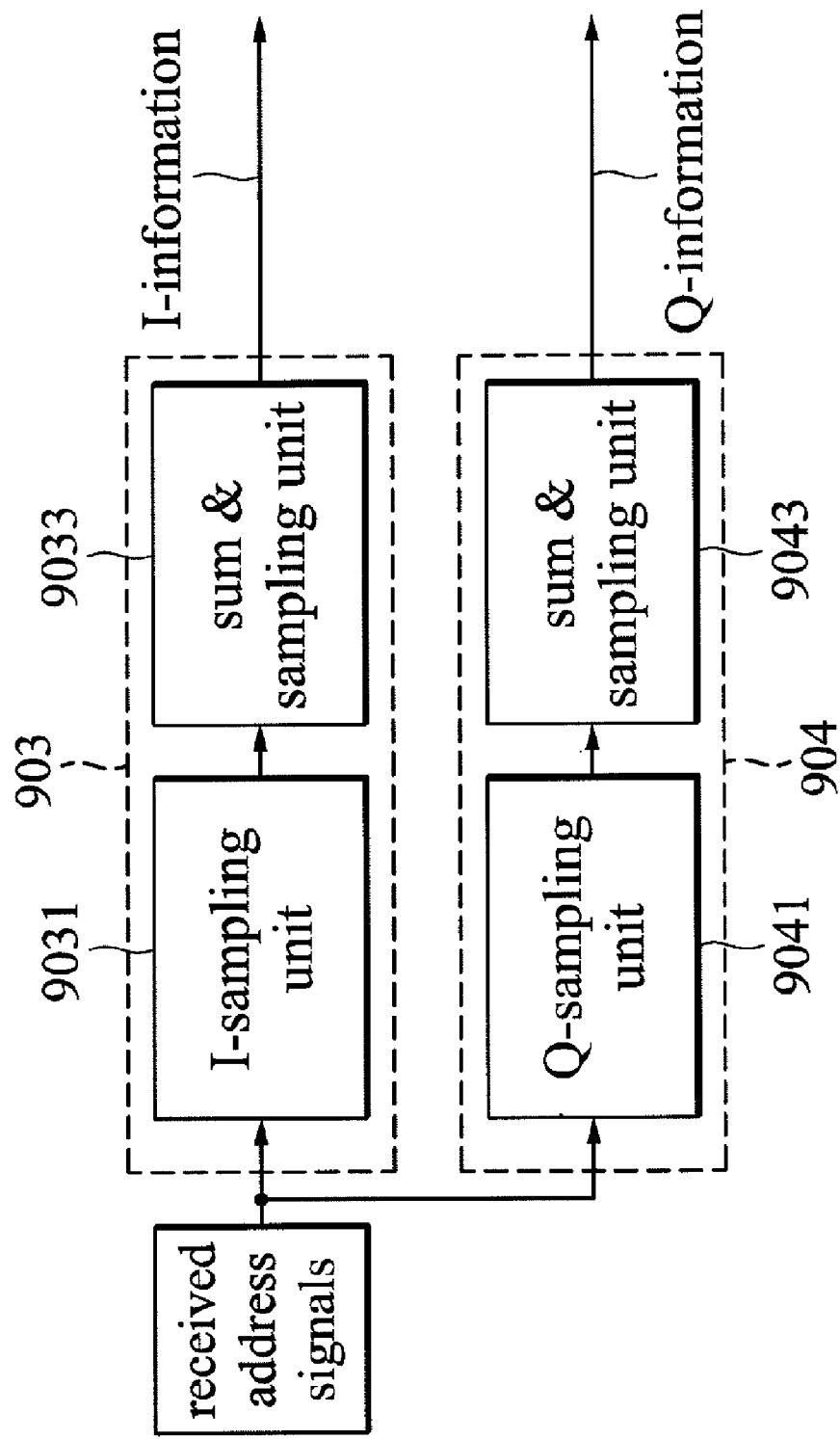
FIG. 10 is a block diagram of the I- and Q-information generators in accordance with the present invention.

Reference is made to FIG. 10, which is a block diagram of the I- and Q-information generators in accordance with the present invention. As shown in the figure, the I-information generator 903 further includes an I-sampling unit 9031 and a sum & sampling unit 9033, and the Q-information generator 904 further includes a Q-sampling unit 9041 and a sum & sampling unit 9043.

The I-sampling unit 9031 is used to sample the filtered signal to produce the I-sampling signal. The sum & sampling unit 9033 is used for summing up the I-sampling signals of the NWL 18-55 of an ADIP unit to produce the I-information. The Q-sampling unit 9041 is used to sample the filtered signal to produce the Q-sampling signal. The sum & sampling unit 9043 is used for summing up the Q-sampling signals of the NWL 18-55 of an ADIP unit to produce the Q-information.

In this embodiment, the I- and Q-information are obtained via signal sampling. First, the received address signal is filtered by the band-pass filter 901 to extract the constituent of sin(2 wt). Then, the filtered signal is sampled at two different time points to obtain the I-sampling signal and Q-sampling signal, respectively. In this embodiment, the I-sampling signal is obtained by sampling the filtered signal at the time point corresponding to the (1/4) position of every NWL unit. The Q-sampling signal is obtained by sampling the filtered signal at the time point corresponding to the (0/4) position of every NWL unit. Furthermore, the present invention can obtain the I- and Q-sampling signals in yet another way. First, the present invention samples the filtered signal at the time point corresponding to the (1/4) and (3/4) positions of every NWL unit. Next, the I-sampling signal is obtained by subtracting the sampling result corresponding to the (3/4) position from that corresponding to the (1/4) position. Similarly, for obtaining the Q-sampling signal, the present invention samples the filtered signal at the time point corresponding to the (0/4) and (2/4) positions of every NWL unit. Finally, the Q-sampling signal is obtained by subtracting the sampling result corresponding to the (2/4) position from that corresponding to the (0/4) position.

In practice, the present invention is not limited to the sampling mechanisms mentioned above. The present invention can use other sampling mechanisms and divide the sampling results into I- and Q-sampling signals according to the times points of sampling.

In the above embodiment of the present invention, the I-sampling unit 9031 and the Q-sampling unit 9041 can use "+1" and "−1" to represent the sampling values (sampling signals) of every NWL unit. This means that if the sampling values are larger than zero, the I-sampling unit 9031 and the Q-sampling unit 9041 use "+1" to represent this sampling value. Otherwise, the I-sampling unit 9031 and the Q-sampling unit 9041 use "−1" to represent this sampling value. After that, the sum & sampling units 9033 and 9043 sum up these sampling values, which are represented as "+1" or "−1". In this way, the present invention mitigates the effect of abrupt noises, and the complexity of the present invention is reduced.

Figure 11:
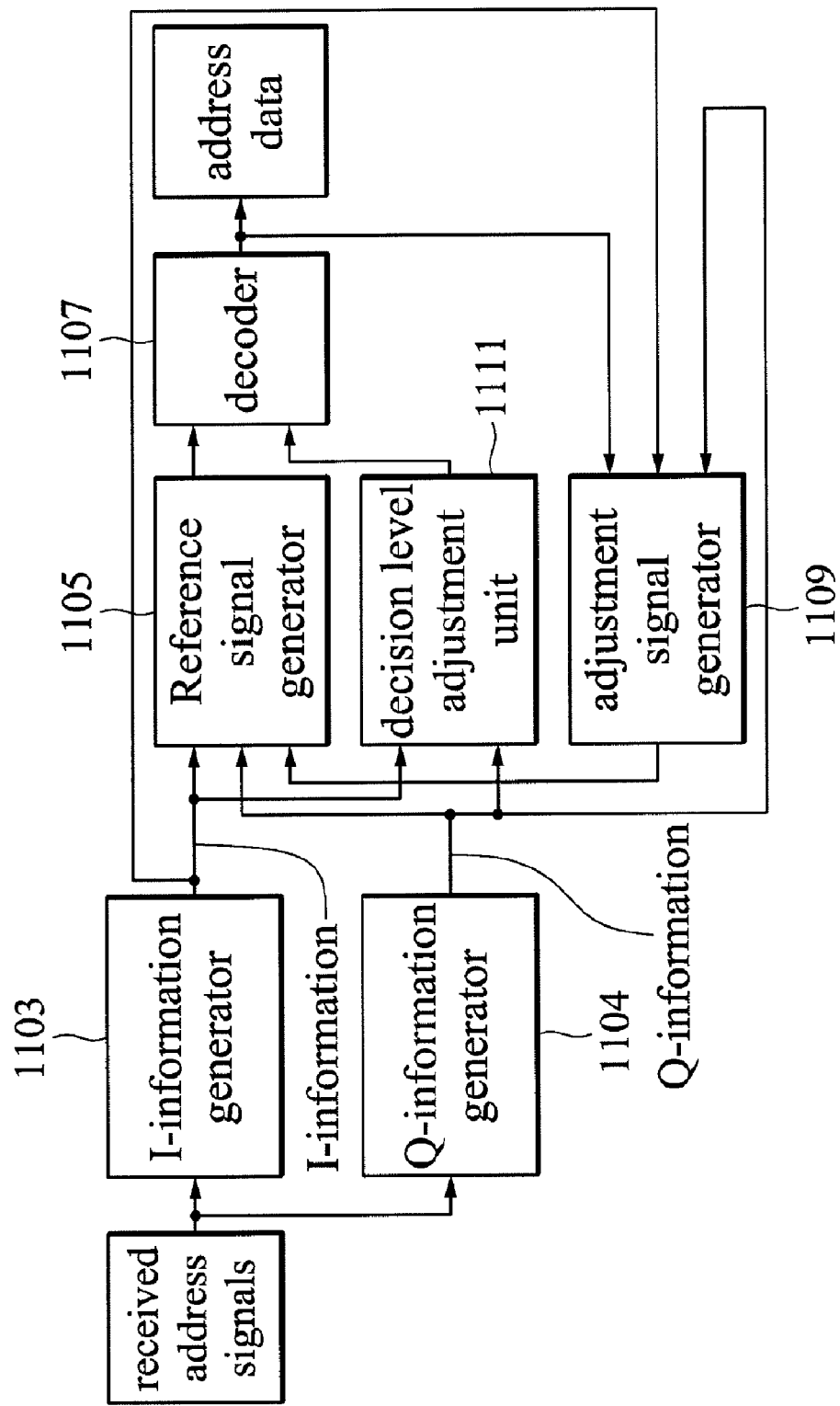
FIG. 11 is a block diagram of an address-accessing device in accordance with the fourth embodiment of the present invention.

Reference is made to FIG. 11, which is a block diagram of an address-accessing device in accordance with the fourth embodiment of the present invention. This embodiment includes an I-information generator 1103, a Q-information generator 1104, a reference signal generator 1105, a decoder 1107, an adjustment signal generator 1109 and a decision level adjustment unit 1111. The fourth embodiment of the present invention is a combination of the first and second embodiments mentioned above. The operations of the fourth embodiment are almost the same as that of the second embodiment. The difference is that the fourth embodiment has the decision level adjustment unit 1111 to adjust the decision level of the decoder 1107 to lower the error rate of address access.

Therein, the operation of the decision level adjustment unit 1111 is similar to that mentioned in the first embodiment. The decision level adjustment unit 1111 uses the I-matching signals obtained by the I-information generator 1103 to produce a decision level. This embodiment of the present invention first access the segments of an ADIP word without the constituent of sin(2 wt) and then calculates the average of the I-matching signals of the received signals to produce a decision level. For example, the present invention first accesses the sync units or monotone units of ADIP words, i.e. the segments without the constituent of sin(2 wt), and then calculates the average of the I-matching signals of the received signals to produce the decision level.

Figure 12:
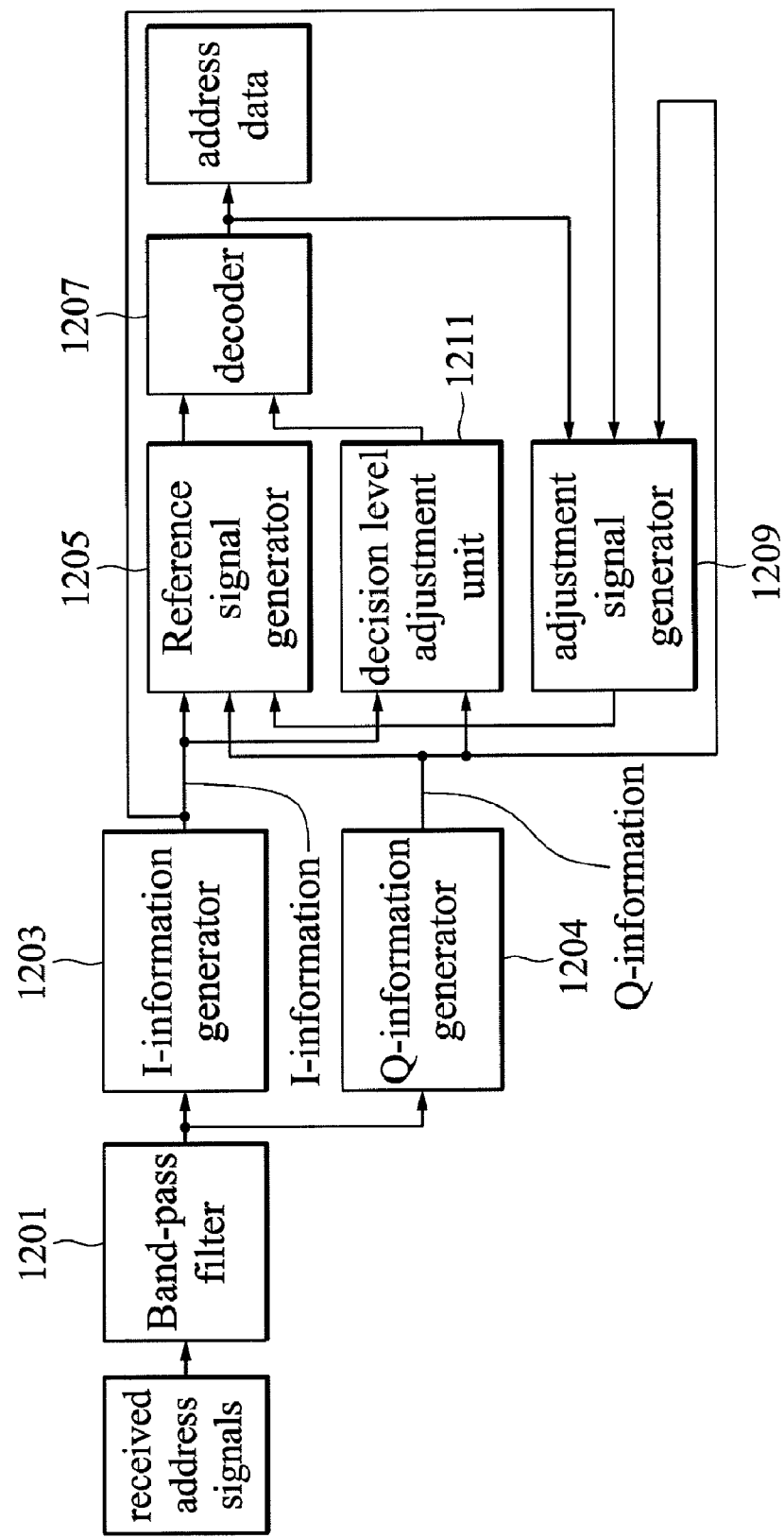
FIG. 12 is a block diagram of an address-accessing device in accordance with the fifth embodiment of the present invention.

Reference is made to FIG. 12, which is a block diagram of an address-accessing device in accordance with the fifth embodiment of the present invention. This embodiment includes a band-pass filter 1201, an I-information generator 1203, a Q-information generator 1204, a reference signal generator 1205, a decoder 1207, an adjustment signal generator 1209 and a decision level adjustment unit 1211. The fifth embodiment of the present invention is a combination of the first and third embodiments mentioned above. The operations of the fifth embodiment are almost the same as that of the third embodiment. The difference is that the fifth embodiment has the decision level adjustment unit 1211 to adjust the decision level of the decoder 1207 to lower the error rate of address access.

Therein, the operation of the decision level adjustment unit 1211 is similar to that mentioned in the first embodiment. The decision level adjustment unit 1211 uses the I-matching signals obtained by the I-information generator 1203 to produce a decision level. This embodiment of the present invention first accesses the segments of an ADIP word without the constituent of sin(2 wt) and then calculates the average of the I-matching signals of the received signals to produce a decision level. For example, the present invention first accesses the sync units or monotone units of ADIP words, i.e. the segments without the constituent of sin(2 wt), and then calculates the average of the I-matching signals of the received signals to produce the decision level.

Figure 13:
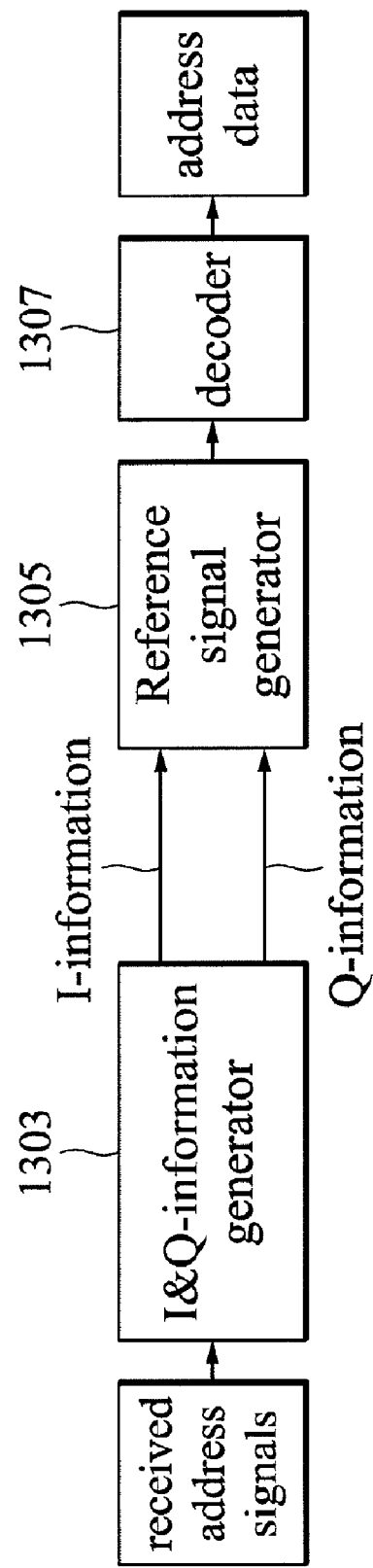
FIG. 13 is a block diagram of an address-accessing device in accordance with the sixth embodiment of the present invention.

Reference is made to FIG. 13, which is a block diagram of an address-accessing device in accordance with the sixth embodiment of the present invention. This embodiment includes an I&Q-information generator 1303, a reference signal generator 1305 and a decoder 1307.

Therein, the I&Q-information generator 1303 can be implemented in two kinds of structures. The first way is by combining the I-information generator 703 and the Q-information generator 704, as shown in FIG. 8, to form the I&Q-information generator 1303. The other way is by combining the band-pass filter 901, the I-information generator 903 and the Q-information generator 904, as shown in FIG. 10, to form the I&Q-information generator 1303.

The reference signal generator 1305 can also be implemented in two kinds of structures. The first way is by combining the reference signal generator 705 and the adjustment signal generator 709, as shown in FIG. 7, to form the reference signal generator 1305. The second way is by combining the reference signal generator 905 and the adjustment signal generator 909, as shown in FIG. 9, to form the reference signal generator 1305.

Figure 1A:
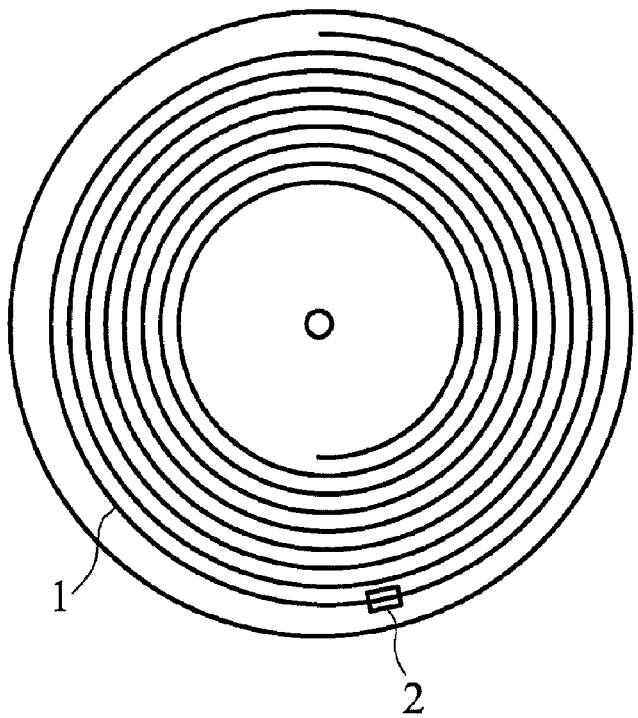
FIG. 1a is a schematic diagram of a conventional optical disc.
Figure 1B:
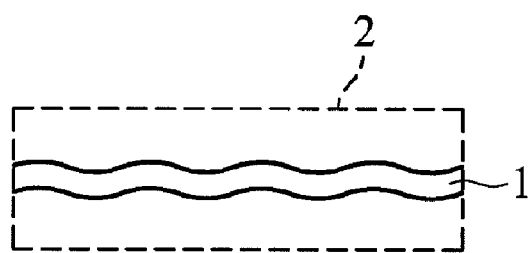
FIG. 1b is an enlarged diagram of a pre-groove segment of a conventional optical disc.
Figure 2A:
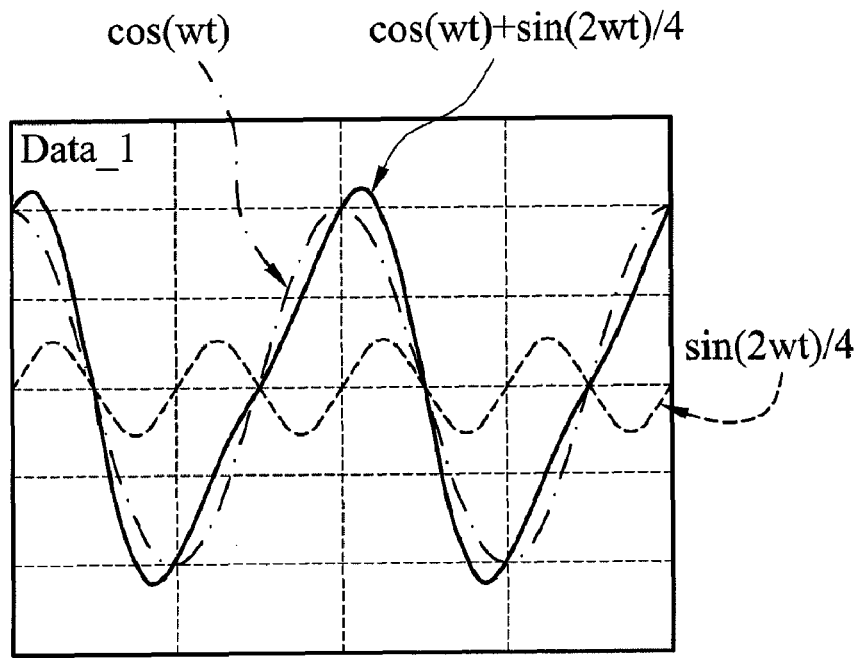
FIGS. 2a-b show predetermined structures for NWL units of a conventional optical disc.
Figure 2B:
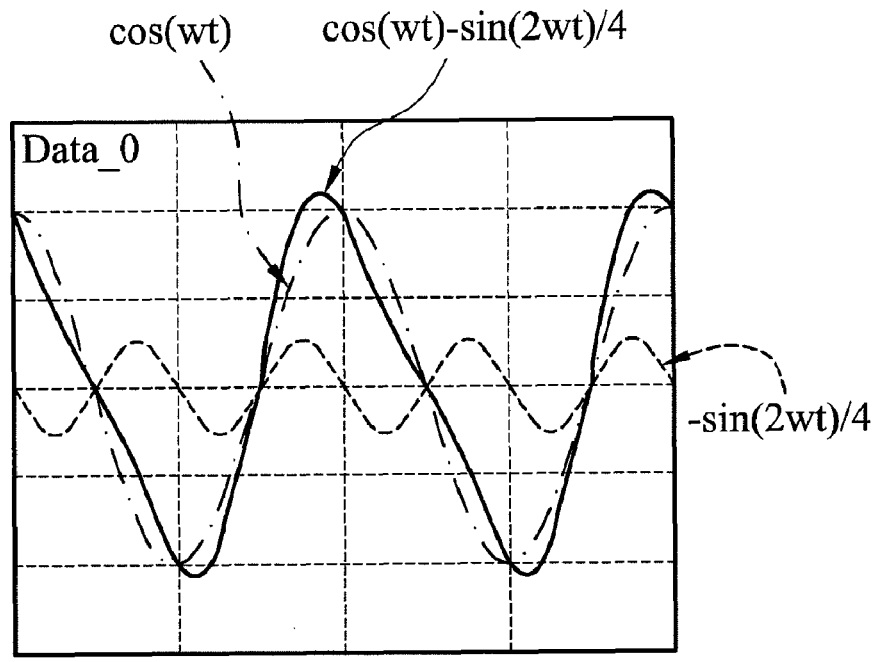
Figure 3:
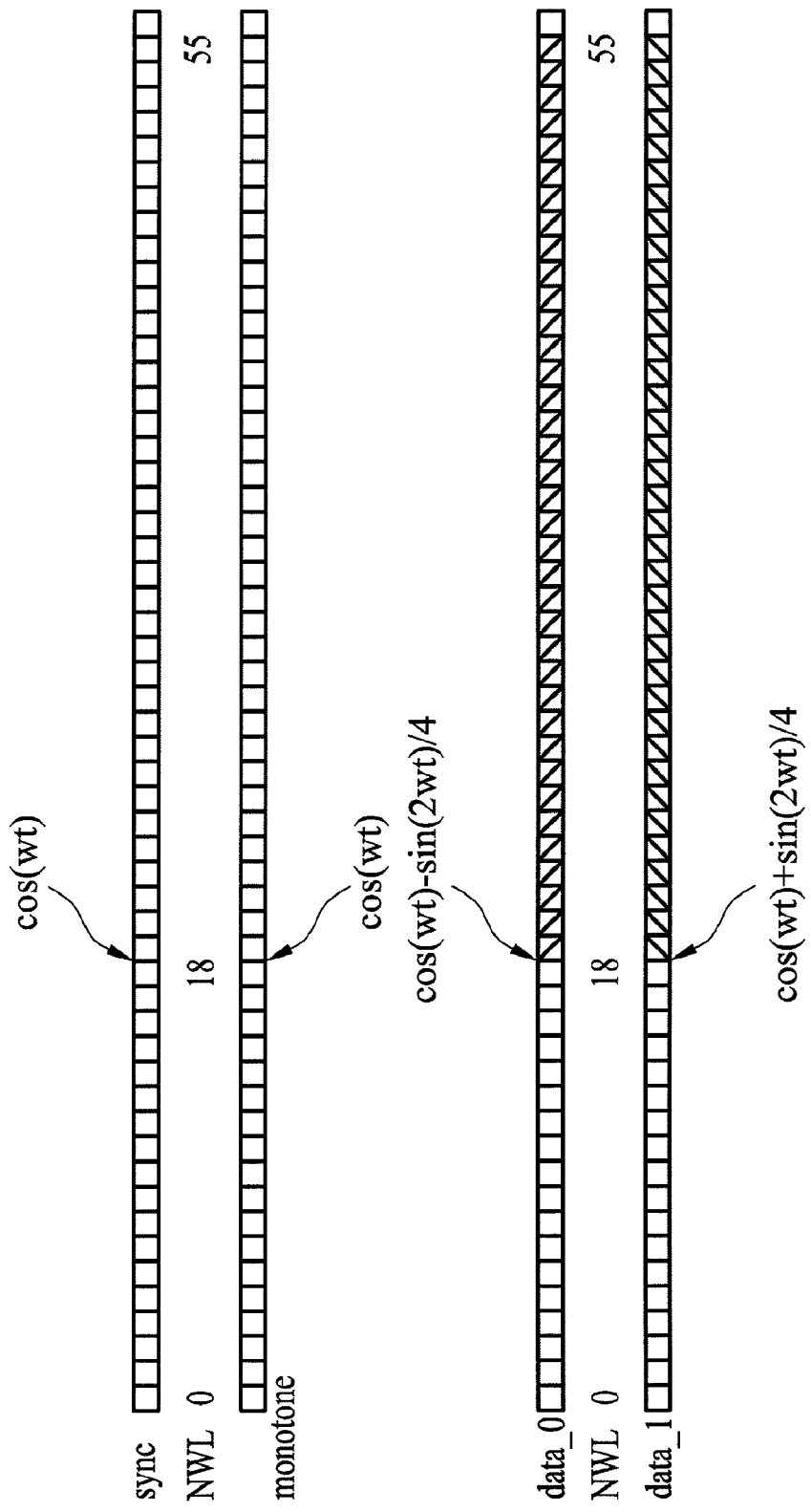
FIG. 3 shows examples of ADIP units of a conventional Blu-ray disc.
Figure 4:
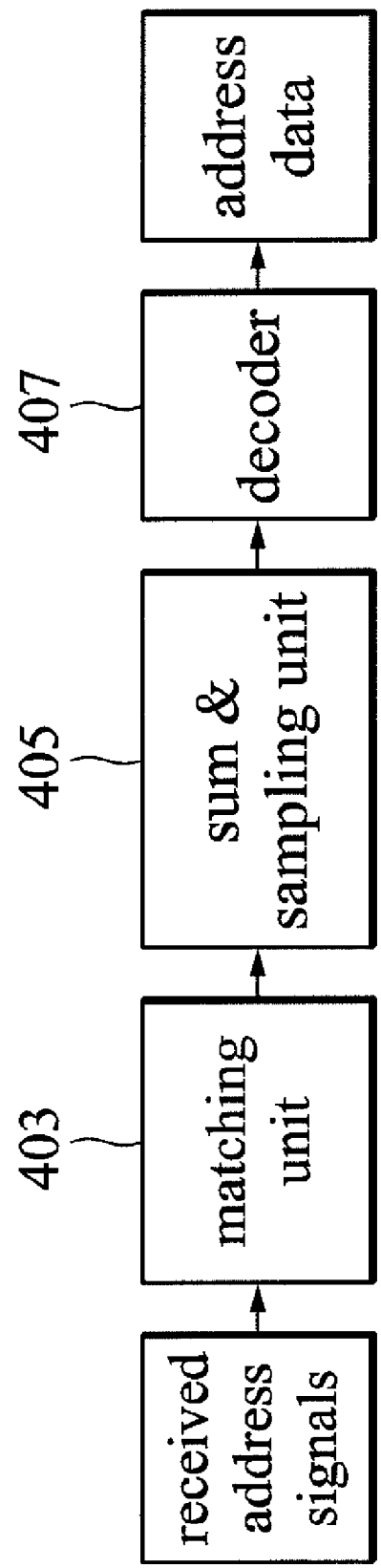
FIG. 4 is a block diagram of a conventional address-accessing device.
Figure 5:
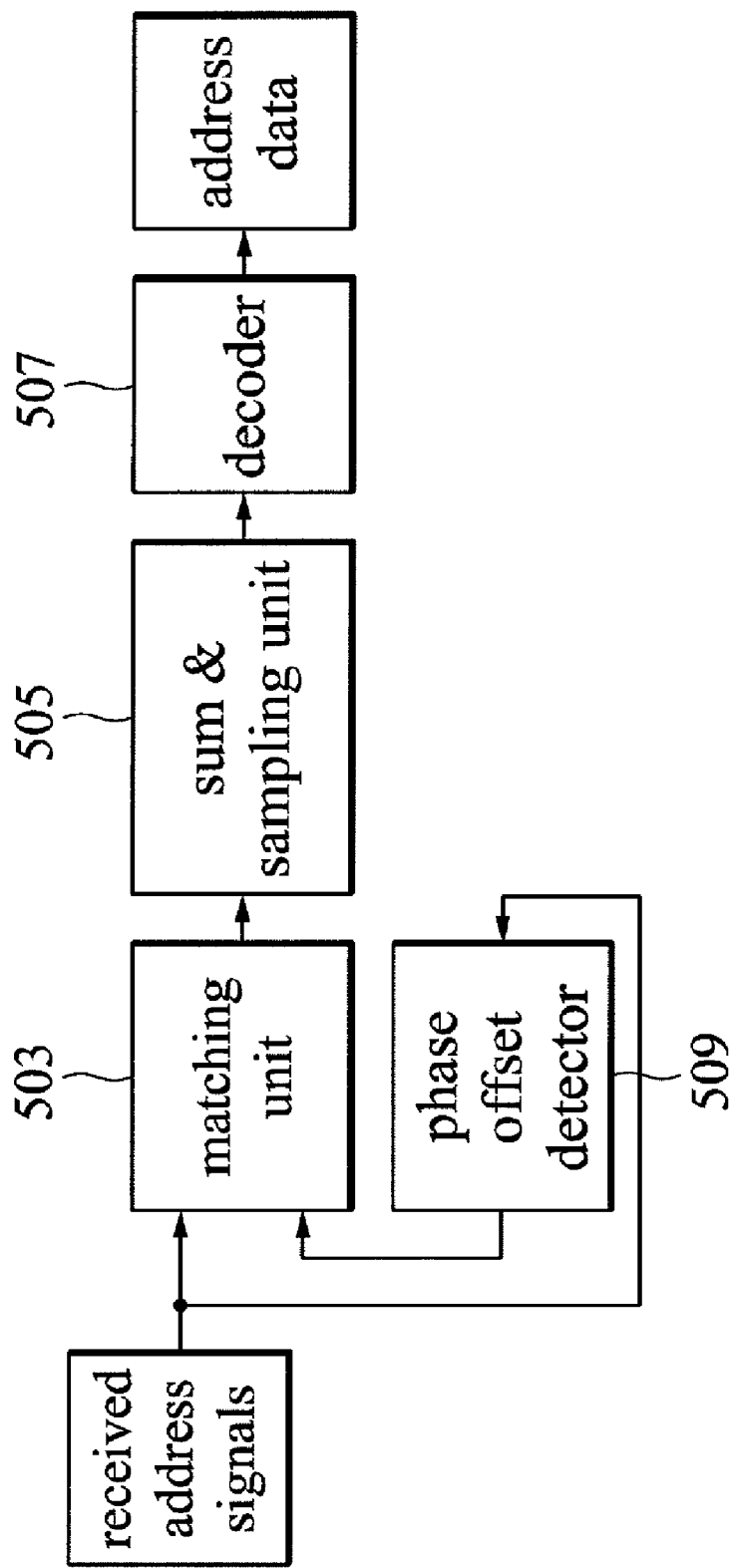
FIG. 5 is a block diagram of another conventional address-accessing device.

The decoder 1307 can also be implemented in two kinds of structures. The first way is by using the decoder 407, as shown in FIG. 4, to form the decoder 1307. The second way is by combining the decoder 607 and the decision level adjustment unit 609, as shown in FIG. 6, to form the decoder 1307.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are embraced within the scope of the invention as defined in the appended claims.

What is claimed is:

1. A device for accessing address information in an optical disc, comprising:
   a matching unit for generating matched values corresponding to a received address signal according to a matching signal, wherein the received address signal comprises a non-data segment and a data segment;
   a sum & sampling unit for summing up the matched values corresponding to the data segment to output a reference signal;
   a decision level adjustment unit capable of using the matched values corresponding to the data segment provided by the matching unit to generate a decision level; and
   a decoder used to determine a structure type of the data segment according to the reference value and the decision level.

2. The device as claimed in claim 1, wherein the decision level adjustment unit averages the matched values corresponding to the data segment to produce the decision level.

3. The device as claimed in claim 1, wherein the decision level adjustment unit first averages the matched values of the received address signals corresponding to segments of an ADIP word with the constituent of sin(2 wt) and a constituent of −sin(2 wt) to produce values of L1 and L0 respectively, and then the decision level adjustment unit uses the values of L1 and L0 to calculate the decision level.

4. The device as claimed in claim 3, wherein the decision level is (L0+L1)/2.

5. The device as claimed in claim 1, wherein the data segment includes NWL 18-55 of an ADIP unit.

6. The device as claimed in claim 1, wherein the decision level adjustment unit further averages the matched values corresponding to the non-data segment to produce the decision level.

7. A method for accessing address information in an optical disc, comprising:
   generating matched values corresponding to a received address signal according to a matching signal, wherein the received address signal comprises a non-data segment and a data segment;
   summing up the matched values corresponding to the data segment to output a reference signal;
   generating a decision level according to the matched values corresponding to the data segment; and
   determining a structure type of the data segment according to the reference signal and the decision level.

8. The method as claimed in claim 7, wherein the decision level adjustment unit averages the matched values corresponding to the data segment to produce the decision level.

9. The method as claimed in claim 7, wherein the decision level adjustment unit first averages the matched values of the received address signals corresponding to segments of an ADIP word with the constituent of sin(2 wt) and a constituent of −sin(2 wt) to produce values of L1 and L0 respectively, and then the decision level adjustment unit uses the values of L1 and L0 to calculate the decision level.

10. The method as claimed in claim 9, wherein the decision level is (L0+L1)/2.

11. The device as claimed in claim 7, wherein the data segment includes NWL 18-55 of an ADIP unit.

12. The device as claimed in claim 7, wherein the decision level adjustment unit further averages the matched values corresponding to the non-data segment to produce the decision level.

* * * * *